(12) United States Patent
Hiwaki et al.

(10) Patent No.: US 7,723,877 B2
(45) Date of Patent: May 25, 2010

(54) MOTOR

(75) Inventors: Hideharu Hiwaki, Osaka (JP); Hiroshi Murakami, Osaka (JP); Kiyomi Kawamura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/997,800

(22) PCT Filed: Nov. 24, 2006

(86) PCT No.: PCT/JP2006/324041

§ 371 (c)(1),
(2), (4) Date: Feb. 4, 2008

(87) PCT Pub. No.: WO2007/063976

PCT Pub. Date: Jun. 7, 2007

(65) Prior Publication Data

US 2009/0128075 A1  May 21, 2009

(30) Foreign Application Priority Data

Nov. 29, 2005 (JP) .............................. 2005-343266

(51) Int. Cl.
*H02K 11/00* (2006.01)
*H02K 21/00* (2006.01)

(52) U.S. Cl. ..................... 310/68 B; 310/152
(58) Field of Classification Search ................ 310/68 B
See application file for complete search history.

(56) References Cited

U.S. PATENT DOCUMENTS

| 5,245,235 A | 9/1993 | Nagai et al. |
|---|---|---|
| 5,319,270 A | 6/1994 | Tanaka et al. |
| 5,500,994 A | 3/1996 | Itaya |
| 5,801,900 A | 9/1998 | Elsaesser et al. |
| 6,242,826 B1 | 6/2001 | Saito et al. |

FOREIGN PATENT DOCUMENTS

| JP | 11299207 A | * | 10/1999 |
|---|---|---|---|
| JP | 2003052159 A | * | 2/2003 |
| JP | 2003070191 A | * | 3/2003 |
| JP | 2005168264 A | * | 6/2005 |

OTHER PUBLICATIONS

Machine Translation JP 2003052159A (2003).*
Machine Translation JP11299207A (1999).*
Machine Translation JP2005168264A (2005).*
Machine Translation JP2003052159 (2003) and JP2003070191 (2003).*
International Search Report for PCT/JP2006/324041, dated Aug. 2, 2007.

* cited by examiner

*Primary Examiner*—Quyen Leung
*Assistant Examiner*—Jose A Gonzalez Quinones
(74) *Attorney, Agent, or Firm*—RatnerPrestia (57) ABSTRACT

A stator of a motor includes a stator core formed of a plurality of teeth and an annular yoke connecting the teeth to each other, and windings wound on the teeth. A rotor of the motor confronts the stator while supported rotatably, and includes a rotor magnet, a rotor core, and a position sensing magnet. The motor further includes a position sensor for sensing a rotational position of the rotor and a circuit board for supplying an electric current to the windings in response to the rotational position of the rotor. The rotor magnet, the rotor core, and the position sensing magnet are integrated into one unit, which is mounted on a shaft of the rotor.

5 Claims, 6 Drawing Sheets

MOTOR

This application is a U.S. National Phase Application of PCT International Application PCT/JP2006/324041.

TECHNICAL FIELD

The present invention relates to a motor structure accurately sensing a rotational position of a rotor of the motor.

BACKGROUND ART

Figure 5:
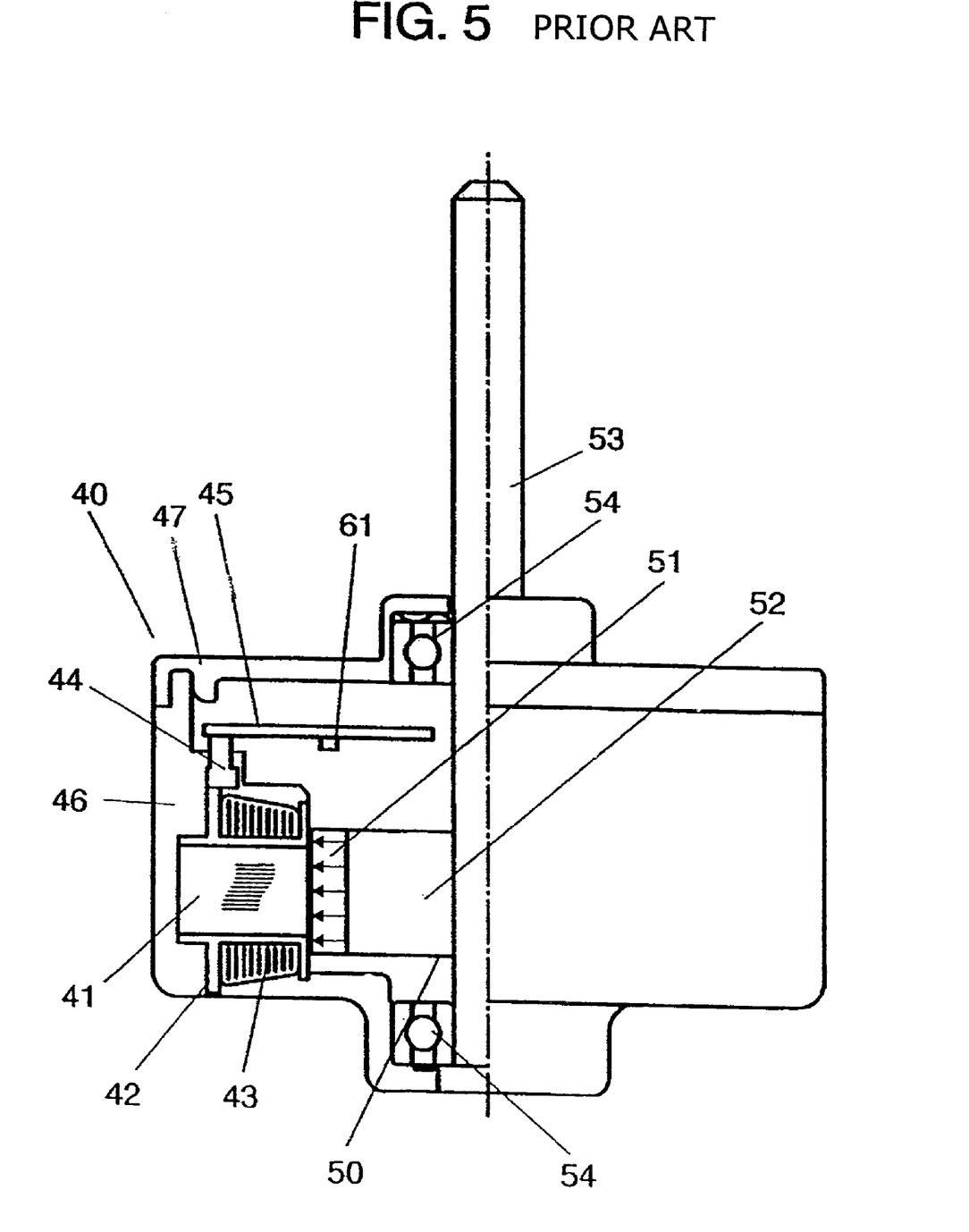
FIG. 5 shows a motor structure of prior art 1.

FIG. 5 shows a motor structure of prior art 1, and this motor is formed of stator 40 and rotor 50. Stator 40 comprises the following elements: stator core 41, winding 43 wound via insulator 42 on respective teeth of stator core 41 in a concentrated manner, terminal 44, circuit board 45, resin mold 46 for sealing all or parts of the elements discussed above, and bracket 47. Three-phase windings are regularly used in this motor. Circuit board 45 includes various components necessary for driving the motor.

Rotor 50 is placed inside of stator 40, and has shaft 53 at the center of rotor core 52. Shaft 53 is rotatably supported by two bearings 54. Rotor 50 forms a surface magnet rotor, i.e. rotor magnet 51 is mounted on an outer wall of rotor core 52. Rotor 50 rotates on shaft 53 due to the interaction between the magnetic field formed by an electric current running through winding 43 wound on stator 40 and the magnetic poles of rotor magnet 51.

Driving of the motor needs to regulate the electric current running through winding 43 in response to a rotational position of rotor 50, so that some means is needed for accurately sensing the rotational position of rotor 50.

In a conventional manner, position sensor 61, such as a Hall element or a Hall IC, mounted to circuit board 45 is used in many cases as a means for sensing the rotational position for the motor to sense the rotational position of rotor 50.

At this time, extra-close placement of rotor magnet 51 mounted on rotor 50 to position sensor 61 allows sensing a major magnetic flux, which rotates rotor 50, generated from rotor magnet 51. However, in actual, presence of a coil end, namely, a protruding part of winding 43 from stator core 41, sets a limit to the closer placement of rotor magnet 51 to position sensor 61. The extra-close placement of rotor magnet 51 to position sensor 61 also refers to the close placement of position sensor 61 to stator core 41 or winding 43. As a result, position sensor 61 is affected by the magnetic flux, which is generated by the electric current running through winding 43 and issued from stator 40, so that the accuracy of sensing the rotor position is lowered, for position sensor 61 originally aims to sense the rotor position by sensing the magnetic flux issued from rotor magnet 51.

Figure 6:
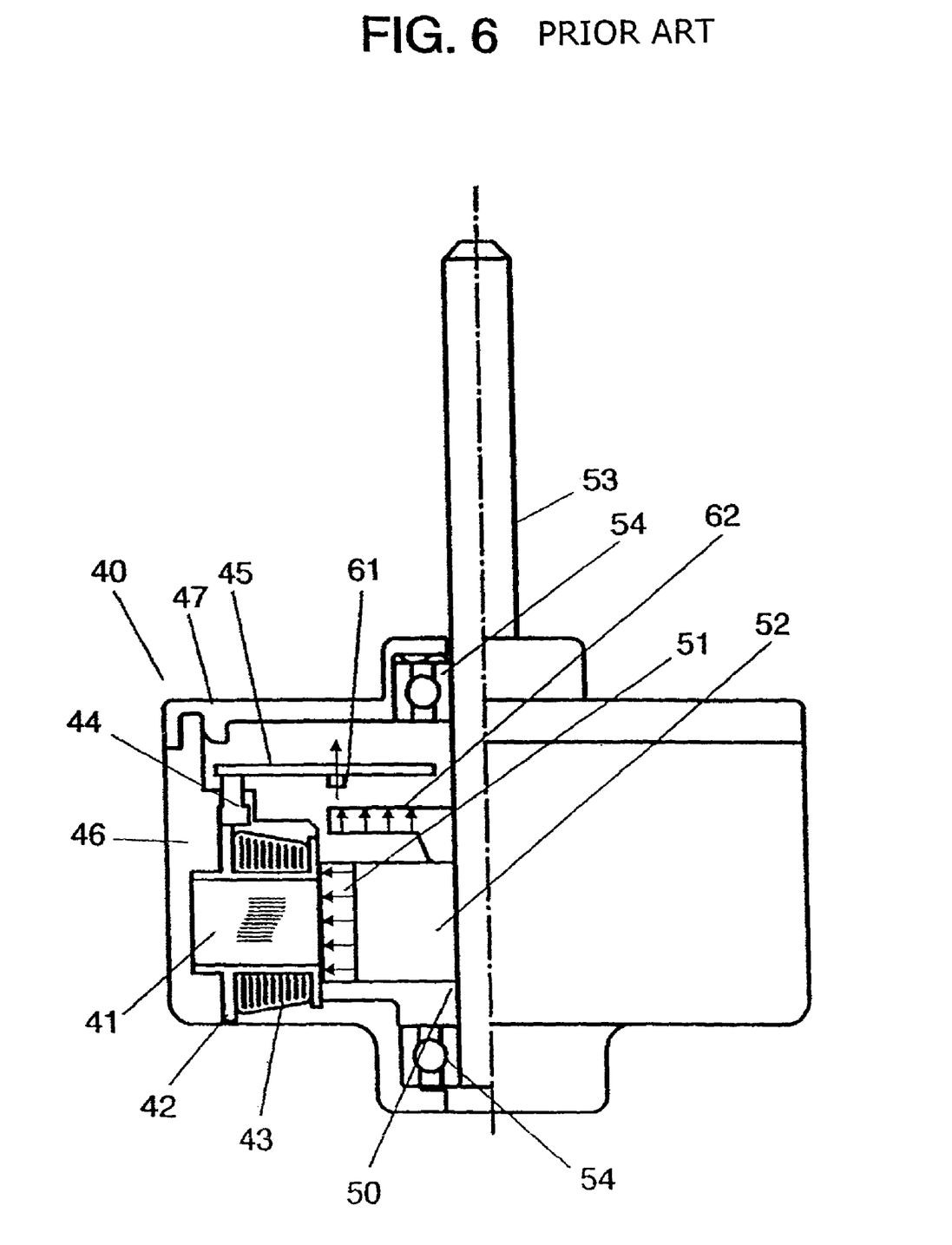
FIG. 6 shows a motor structure of prior art 2.

FIG. 6 shows a motor structure of prior art 2. Elements similar to those of prior art 1 shown in FIG. 5 have the same reference marks, and the descriptions thereof are omitted here. The motor of prior art 2 differs from the motor of prior art 1 in the following point: As shown in FIG. 6, position sensing magnet 62 is mounted to rotor 50 besides rotor magnet 51. Position sensing magnet 62 is axially magnetized so that the magnetic flux generated from magnet 62 can positively interlink with position sensor 61, which thus accurately senses a rotational position of rotor 50. This structure is disclosed in, e.g. Unexamined Japanese Patent Publication No. H11-299207.

The motor of prior art 2, however, has discrete components of rotor magnet 51 and position sensing magnet 62, so that variations are obliged to happen in the positional relation between magnet 51 and magnet 62 both mounted to rotor core 52. The variations sometimes lower the accuracy of sensing the position, and the structure discussed above increases the number of steps of assembling rotor 50.

DISCLOSURE OF INVENTION

A motor of the present invention includes a stator and a rotor. The stator is formed of a stator core comprising a plurality of teeth and an annular yoke for coupling the teeth to each other, and windings provided to the teeth. The rotor is rotatably supported while confronting the stator, and is formed of a rotor magnet, a rotor core and a position sensing magnet. The motor of the present invention further includes a position sensor for sensing a rotational position of the rotor, and a circuit board for supplying an electric current to the windings in response to the rotational position of the rotor. The rotor magnet, the rotor core, and the position sensing magnet are integrated into one unit, which is mounted to a shaft of the rotor.

The foregoing structure allows eliminating assembly variations occurring when the rotor core is mounted to the shaft, so that the accuracy of sensing the rotor position can be improved. As a result, a reliable motor can be available.

DESCRIPTION OF PREFERRED EMBODIMENTS

Exemplary embodiments of the present invention are demonstrated hereinafter with reference to the accompanying drawings.

Embodiment 1

Figure 1:
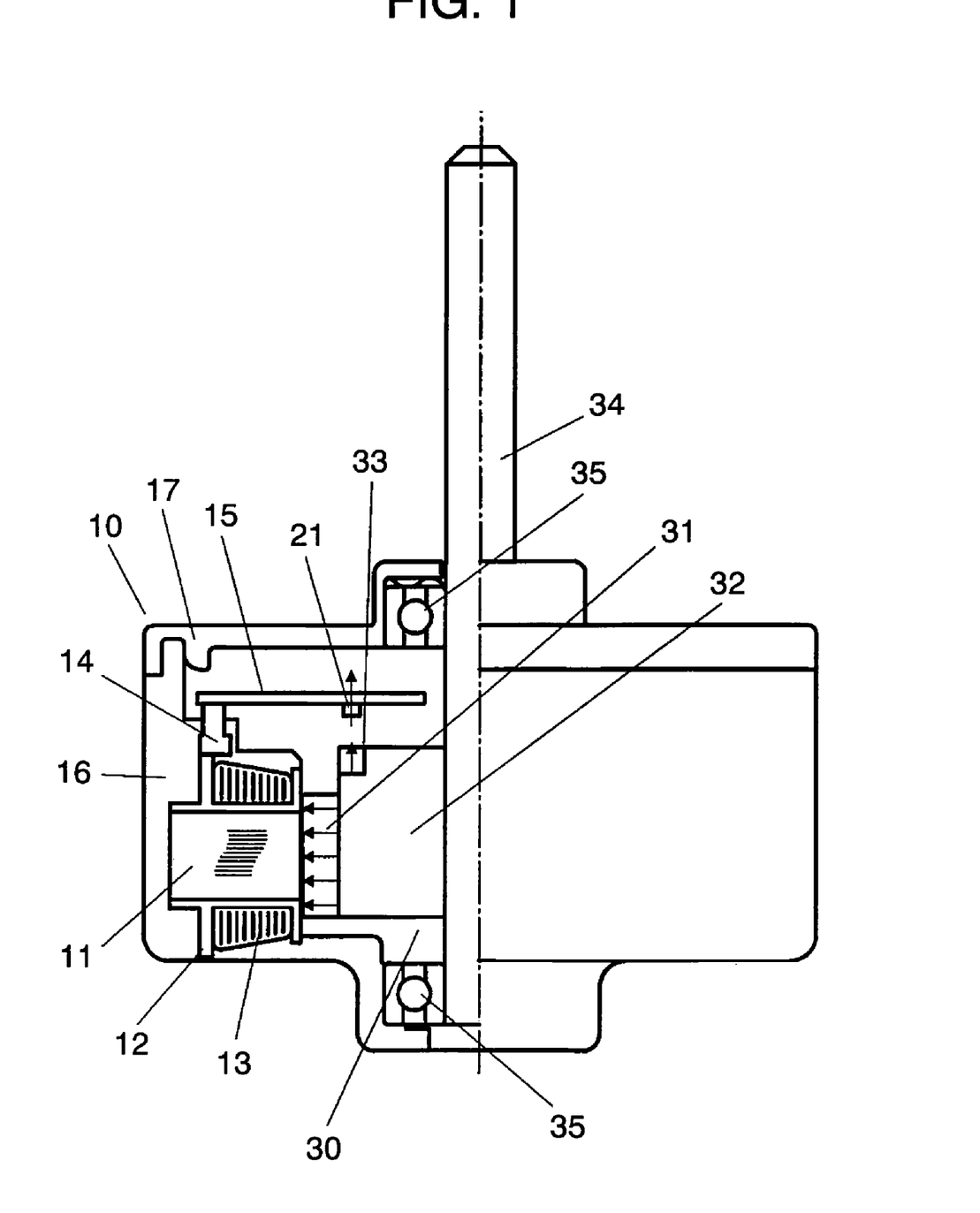
FIG. 1 shows a structure of a motor in accordance with a first embodiment of the present invention.

FIG. 1 shows a structure of a motor in accordance with the first embodiment of the present invention. In FIG. 1, the left half, defined with the center line drawn in an alternate long and short dash line, shows a sectional view of the motor. First, major structural elements of the motor are described with reference to FIG. 1.

The motor in accordance with this first embodiment of the present invention includes stator 10 and rotor 30. Stator 10 is formed of stator core 11 comprising a plurality of teeth (not shown) and an annular yoke for coupling the teeth to each other, and windings 13 provided to the teeth. Rotor 30 is rotatably supported while it confronts stator 10, and is formed of rotor magnet 31, rotor core 32, and position sensing magnet 33. The motor of the present invention further includes position sensor 21 for sensing a rotational position of rotor 30, and circuit board 15 for supplying an electric current to the windings in response to the rotational position of rotor 30. Rotor magnet 31, rotor core 32, and position sensing magnet 33 are integrated into one unit, which is then mounted to shaft 34 of rotor 30.

The structure of the motor in accordance with this first embodiment is detailed hereinafter. The motor shown in FIG. 1 is a brushless motor of which respective teeth of stator core 11 are wound with concentrated windings 13, and includes stator 10 and rotor 30.

Stator 10 comprises the following elements:
stator core 11;
winding 13 wound on, via insulator 12, respective teeth of stator core 11;
circuit board 15;
terminal 14 for electrically coupling an end of winding 13 to circuit board 15;
resin mold 16 for sealing all or parts of the foregoing elements with resin; and
bracket 17.

Each one of the teeth is wound with a three-phase winding. In this winding, an electric current having a phase difference of 120 degrees in electrical angles from each other runs. Circuit board 15 includes position sensor 21 and other components necessary for driving the motor.

Rotor 30 is placed inside of stator 10 such that it confronts stator 10 via a clearance. Rotor 30 includes shaft 34 at the center of rotor core 32. Shaft 34 is rotatably supported by two bearings 35. First bearing 35 is held by resin mold 16, and second bearing 35 is held by bracket 17. Rotor 30 forms a surface magnet rotor, i.e. rotor magnet 31 is mounted on the outer wall of rotor core 32. Rotor magnet 31, rotor core 32 and position sensing magnet 33 are integrated into one unit, which is then mounted on shaft 34.

Rotor 30 rotates on shaft 34 due to interaction between the magnetic field generated by the electric current running through winding 13 of stator 10 and the magnetic poles of rotor magnet 31. At this time, position sensor 21 senses a position of rotor 30, and the electric current running through winding 13 is regulated in response to the rotational position of rotor 30.

In general, if rotor magnet 31 has some positional deviation along the rotating direction from the magnetic poles of position sensing magnet 33, the three-phase current running through winding 13 is disturbed. As a result, torque ripple occurs, which causes degradation the motor characteristics such as increment of vibrations and noises accompanying the motor rotation or decrement of the torque constant. The decrement of torque constant invites temperature rise in the motor, so that the reliability of the motor lowers.

However, in the structure described in this embodiment, i.e. rotor magnet 31, rotor core 32, and position sensing magnet 33 are integrated into one unit, which is then mounted on shaft 34, no positional deviation can be expected between rotor magnet 31 and position sensing magnet 33 along the rotating direction during the assembly of rotor 30. This structure thus allows eliminating variations during the assembly of rotor 30, and improving the accuracy of sensing the rotor position. As a result, not only an improvement in the characteristics but also an improvement in the reliability of the motor can be expected.

In addition to the foregoing structure, axial magnetizing of position sensing magnet 33 will increase the magnetic flux interlinking with position sensor 21 out of the entire magnetic flux generated from position sensing magnet 33. In other words, interlinking flux can be increased, which assures sensing the rotational position of rotor 30, so that the motor reliability can be further improved.

It is necessary to take it into consideration that another magnetic flux generated from stator 10 also interlinks with position sensor 21 besides the magnetic flux generated by position sensing magnet 33. This another magnetic flux has a different phase from that of the magnetic flux generated by magnet 33, and affects sensor 21 in different magnitude depending on the amount of the electric current running through winding 13. As a result, the difference between a rotational position sensed by sensor 21 and an actual rotational position of rotor 30 varies depending on the torque generated by the motor. This refers to that some variations occur in the accuracy of sensing the position, and this is an undesirable matter with respect to the motor characteristics as well as the motor reliability.

The first embodiment addresses the foregoing problems, and employs position sensing magnet 33 having a smaller outer diameter than that of rotor magnet 31. This structure allows reducing the influence caused by the magnetic flux generated from stator 10. Rotor 30, in general, is required to be placed near stator core 11 or winding 13 along the radial direction because it generates the magnetic flux necessary for rotating rotor 30. In this connection, the outer diameter of position sensing magnet 33 is set as small as possible comparing with that of rotor magnet 31, so that the distance along the radial direction between magnet 33 and stator core 11 or winding 13 becomes greater. The magnetic flux generated by magnet 33 is thus less affected by the magnetic flux generated from stator 10. On top of this preparation, as shown in FIG. 1, position sensor 21 is placed on circuit board 15 along the radial direction such that sensor 21 axially confronts position sensing magnet 33. This structure is preferable because the magnetic flux generated from stator 10 hardly interlinks with position sensor 21.

Circuit board 15 can have a ferromagnetic substance axially on its opposite face to rotor 30, or circuit board 15 per se can be formed of ferromagnetic material so that the magnetic flux generated by position sensing magnet 33 can positively interlink with position sensor 21.

Embodiment 2

Figure 2:
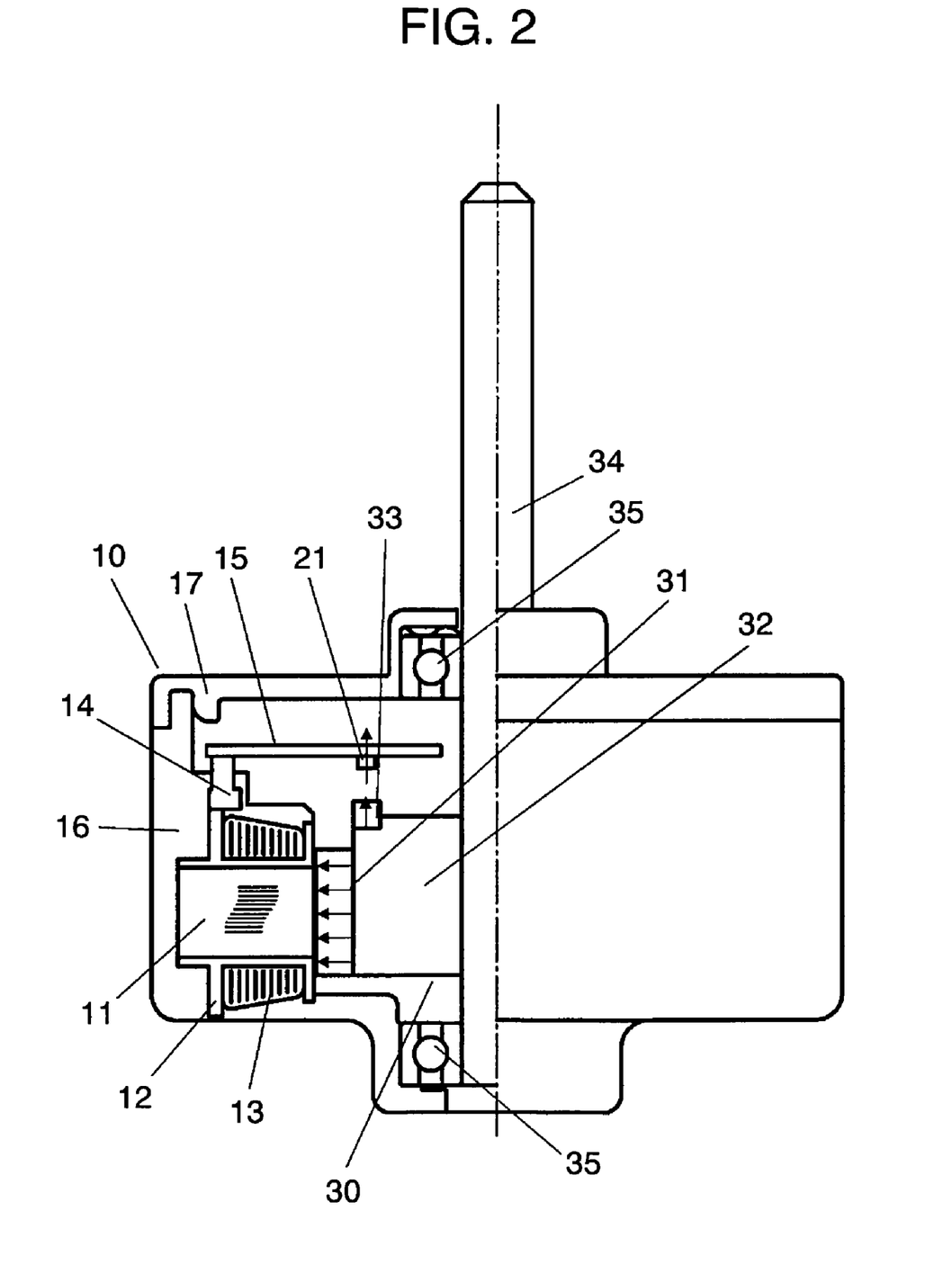
FIG. 2 shows a structure of a motor in accordance with a second embodiment of the present invention.

FIG. 2 shows a structure of a motor in accordance with the second embodiment of the present invention. In FIG. 2, similar elements to those in the first embodiment shown in FIG. 1 have the same reference marks, and the descriptions thereof are omitted here. The motor in accordance with the second embodiment differs from that of the first embodiment shown in FIG. 1 in the following point: As shown in FIG. 2, the motor in accordance with the second embodiment has position sensing magnet 33 protruding axially from rotor core 32 toward position sensor 21. This structure allows reducing the magnetic flux interlinking with rotor core 32 out of the entire magnetic flux generated from position sensing magnet 33 while increasing the magnetic flux interlinking with position sensor 21. As a result, position sensor 21 can accurately sense a rotational position of rotor 30.

Embodiment 3

Figure 3:
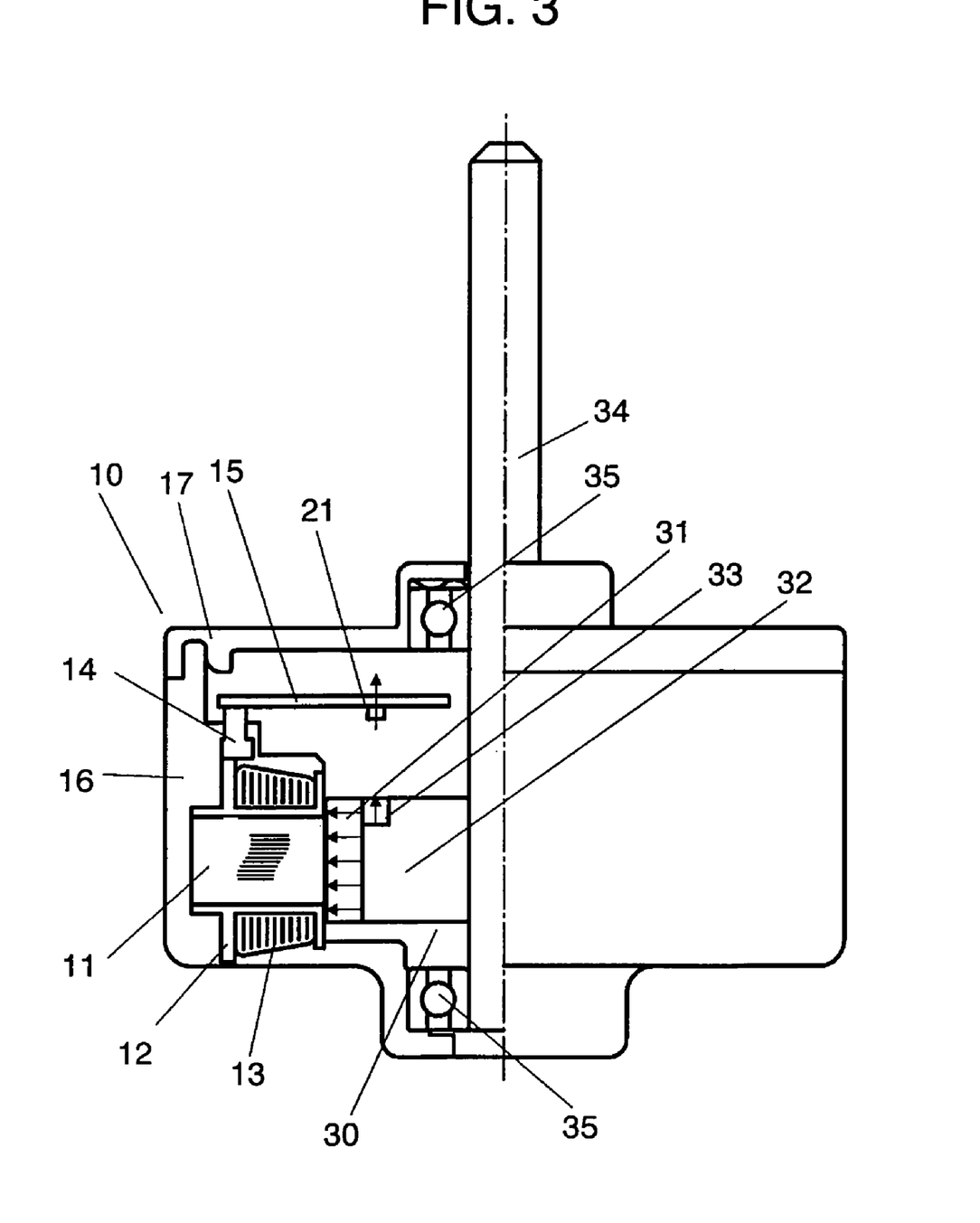
FIG. 3 shows a structure of a motor in accordance with a third embodiment of the present invention.

FIG. 3 shows a structure of a motor in accordance with the third embodiment of the present invention. In FIG. 3, similar elements to those of the first embodiment shown in FIG. 1 and those of the second embodiment shown in FIG. 2 have the same reference marks, and the descriptions thereof are omitted here.

As shown in FIG. 3, the motor in accordance with the third embodiment has position sensing magnet 33 integrated with rotor core 32 into one unit; however, magnet 33 is not needed to protrude from the axial end face of rotor magnet 31. In other words, along the axial direction from rotor core 32 toward position sensor 21, an axial end face of magnet 33 can be flush with or lower than the axial end face of rotor magnet 31.

This structure allows the magnetic flux generated by magnet 33 to be less affected by the magnetic flux generated from stator 10. As a result, position sensor 21 can accurately sense a rotational position of rotor 30.

Embodiment 4

Figure 4:
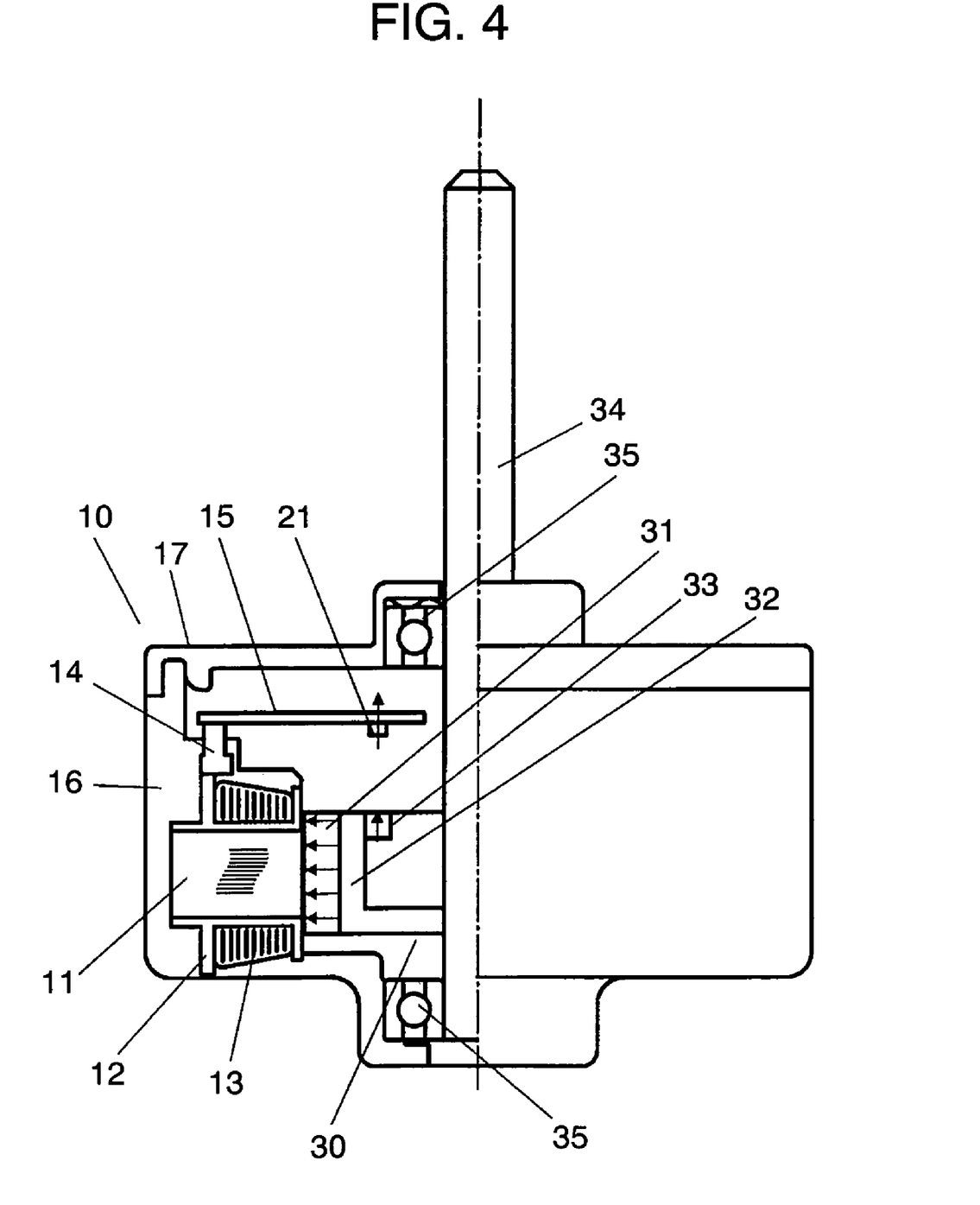
FIG. 4 shows a structure of a motor in accordance with a fourth embodiment of the present invention.

FIG. 4 shows a structure of a motor in accordance with the fourth embodiment of the present invention. In FIG. 4, similar elements to those of embodiments 1, 2 and 3 respectively shown in FIGS. 1, 2 and 3 have the same reference marks, and the descriptions thereof are omitted here.

As shown in FIG. 4, the motor in accordance with the fourth embodiment has rotor core 32 shaping like a cup, and position sensing magnet 33 is placed on an inner wall of cup-like rotor core 32.

Since rotor core 32 shapes like a cup, it only needs the minimum amount of material necessary for rotor magnet 31 and position sensing magnet 33, so that the cost of the motor can be reduced. Use of rotor magnet 31 having weak magnetic force or anisotropic poles, in particular, will save rotor core 32 a greater size in radius direction, so that the foregoing structure is preferable for constructing a magnetic circuit.

The placement of position sensing magnet 33 on the inner wall of cup-like rotor core 32 increases a space between magnet 33 and stator core 11 or winding 13 in the radius direction, so that the magnetic flux generated by magnet 33 is hardly affected by the magnetic flux generated from stator 10. Out of the entire magnetic flux generated by rotor magnet 31, leakage flux, which leaks and does not interlink with stator core 11, interlinks with rotor core 32, so that the entire magnetic flux less affects position sensing magnet 33. As a result, the accuracy of sensing the rotor position can be improved.

In the embodiments discussed previously, the brushless motor employing the concentrated winding on the stator teeth is used; however, the present invention can be applied not only to brushless motors employing a distributed winding on the stator teeth, but also to a variety of motors which need sensing their rotors' rotational positions.

INDUSTRIAL APPLICABILITY

The present invention allows a motor to sense its rotor's rotational position for driving the motor. The motor is thus useful for an application requiring reliability, and an application that needs reducing the characteristics degradation invited by lowering the sensing accuracy of the rotor position, or an application that needs lowering vibrations and noises as much as possible.

The invention claimed is:

1. A motor having a shaft protruding from the motor in an axial direction, the motor comprising:
   a stator including a stator core formed of a plurality of teeth and an annular yoke coupling the teeth to each other, and a winding provided to the teeth;
   a rotor confronting the stator while rotatably supported, and including a rotor magnet, a rotor core and a position sensing magnet;
   a position sensor for sensing a rotational position of the rotor; and
   a circuit board for mounting the position sensor and supplying an electric current to the winding in response to the rotational position of the rotor,
   wherein the circuit board is spaced from the rotor core in the axial direction in which the shaft protrudes,
   the rotor core is shaped like a cup having an opening, the opening facing the circuit board, and
   the rotor magnet, the rotor core and the position sensing magnet are integrated into one unit, which is mounted on the shaft of the rotor so that the rotor magnet is disposed on a circumferential outer wall of the rotor core
   and the position sensing magnet is disposed on a circumferential inner wall of the rotor core.

2. The motor of claim 1, wherein the position sensing magnet is axially magnetized.

3. The motor of claim 1, wherein the position sensing magnet has a smaller outer diameter than an outer diameter of the rotor magnet.

4. The motor of claim 1, wherein the position sensing magnet protrudes from the rotor core along the axial direction.

5. The motor of claim 1, wherein along the axial direction, the position sensing magnet has an axial end face being flush with or lower than an axial end face of the rotor magnet.

* * * * *

UNITED STATES PATENT AND TRADEMARK OFFICE
CERTIFICATE OF CORRECTION

PATENT NO. : 7,723,877 B2 Page 1 of 1
APPLICATION NO. : 11/997800
DATED : May 25, 2010
INVENTOR(S) : Hideharu Hiwaki et al.

It is certified that error appears in the above-identified patent and that said Letters Patent is hereby corrected as shown below:

On the Title Page, Item [56], References Cited, FOREIGN PATENT DOCUMENTS,
add --EP 1 003 270 A1 05/24/2000-- and --EP 1 324 465 A2 07/02/2003--

Signed and Sealed this

Fifth Day of October, 2010

David J. Kappos
*Director of the United States Patent and Trademark Office*